(12) United States Patent
Friel, Sr.

(10) Patent No.: US 6,267,044 B1
(45) Date of Patent: Jul. 31, 2001

(54) BATCH TOASTER

(75) Inventor: Daniel D. Friel, Sr., Greenville, DE (US)

(73) Assignee: Edgecroft Corporation, Avondale, PA (US)

( * ) Notice: Subject to any disclaimer, the term of this patent is extended or adjusted under 35 U.S.C. 154(b) by 0 days.

(21) Appl. No.: 09/569,841

(22) Filed: May 12, 2000

Related U.S. Application Data

(60) Provisional application No. 60/133,914, filed on May 13, 1999.

(51) Int. Cl.⁷ .............................. A47J 37/08; F24C 7/10
(52) U.S. Cl. .................. 99/327; 99/329 P; 99/329 RT; 99/385; 99/389; 99/391; 99/390; 219/386; 219/521
(58) Field of Search .............................. 99/325–333, 339, 99/340, 337, 338, 341, 342, 385–393; 219/518–521, 396, 398, 492, 494, 497, 481, 489, 386; 392/373, 375, 337, 407

(56) References Cited

U.S. PATENT DOCUMENTS

| | | | |
|---|---|---|---|
| 1,893,989 | * | 1/1933 | Galer ................................. 99/390 X |
| 1,926,276 | * | 9/1933 | Forbes ................................. 99/332 |
| 1,967,209 | * | 7/1934 | Lawrence ............................ 99/327 |
| 1,979,845 | * | 1/1933 | Schallis ............................... 99/332 |
| 2,631,523 | * | 3/1953 | Olving ............................ 99/331 X |
| 2,764,081 | * | 9/1956 | Glasser ........................... 99/390 X |
| 4,345,513 | * | 8/1982 | Holt ................................. 99/401 X |
| 5,528,980 | * | 6/1996 | McClean ............................ 99/389 |
| 5,642,657 | * | 7/1997 | Yeung et al. .................... 99/393 X |
| 5,647,270 | * | 7/1997 | Rousseau et al. ............... 99/391 X |
| 5,664,481 | * | 9/1997 | Huggler ............................ 99/391 |
| 5,802,957 | * | 9/1998 | Wanat et al. ................... 219/521 X |
| 5,943,948 | * | 8/1999 | Tanaka .......................... 99/391 X |

* cited by examiner

*Primary Examiner*—Timothy F. Simone
(74) *Attorney, Agent, or Firm*—Connolly Bove Lodge & Hutz LLP

(57) ABSTRACT

A batch type toaster includes a cool remote waiting zone and an intrinsically controlled transport mechanism that retains the bread in said waiting zone while the toasting zone is heating to optimum toasting conditions and subsequently moves the bread into the preheated toasting zone until the desired browning is obtained.

20 Claims, 5 Drawing Sheets

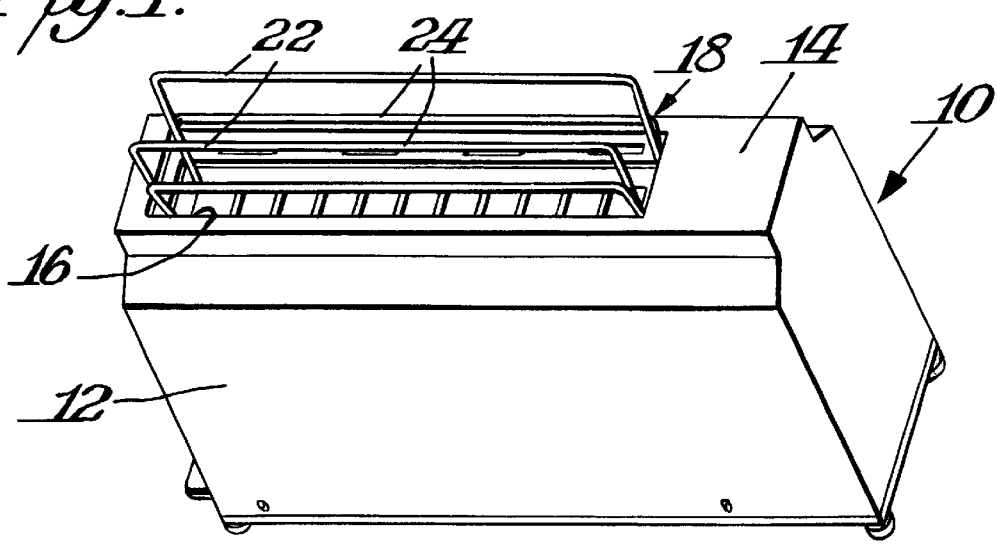
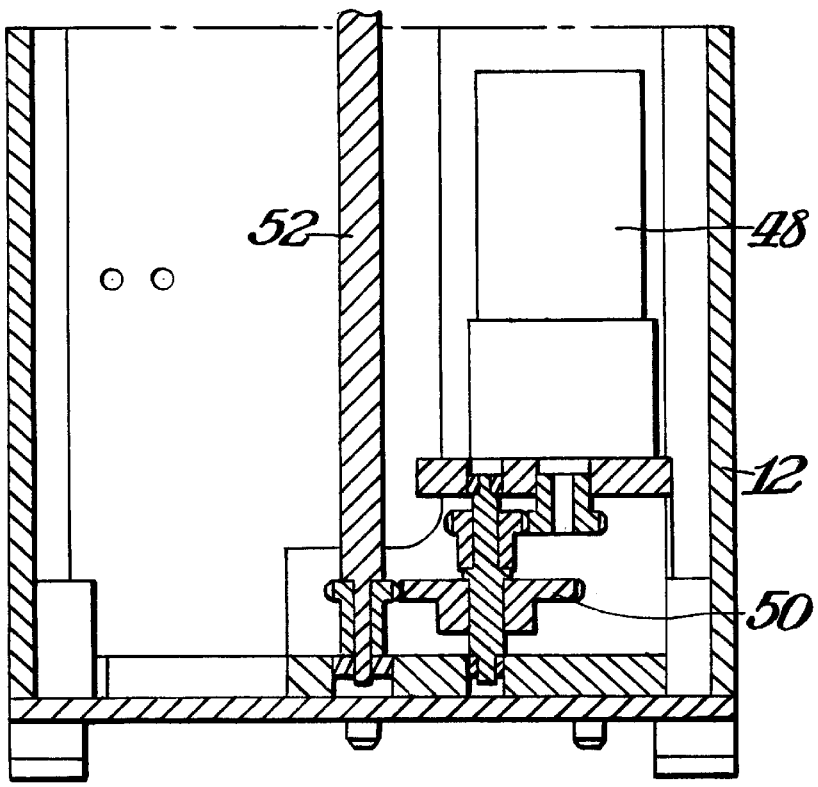

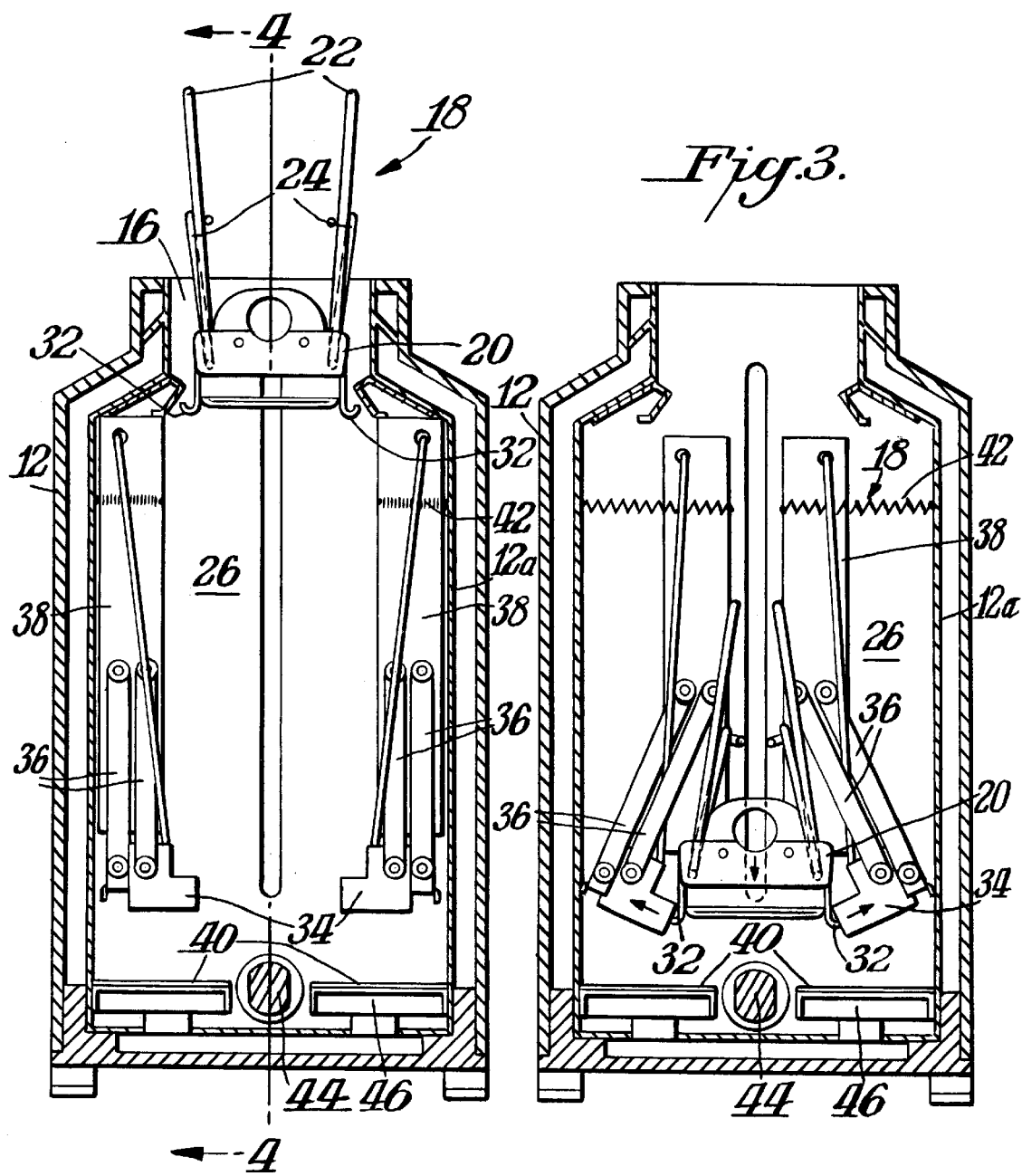

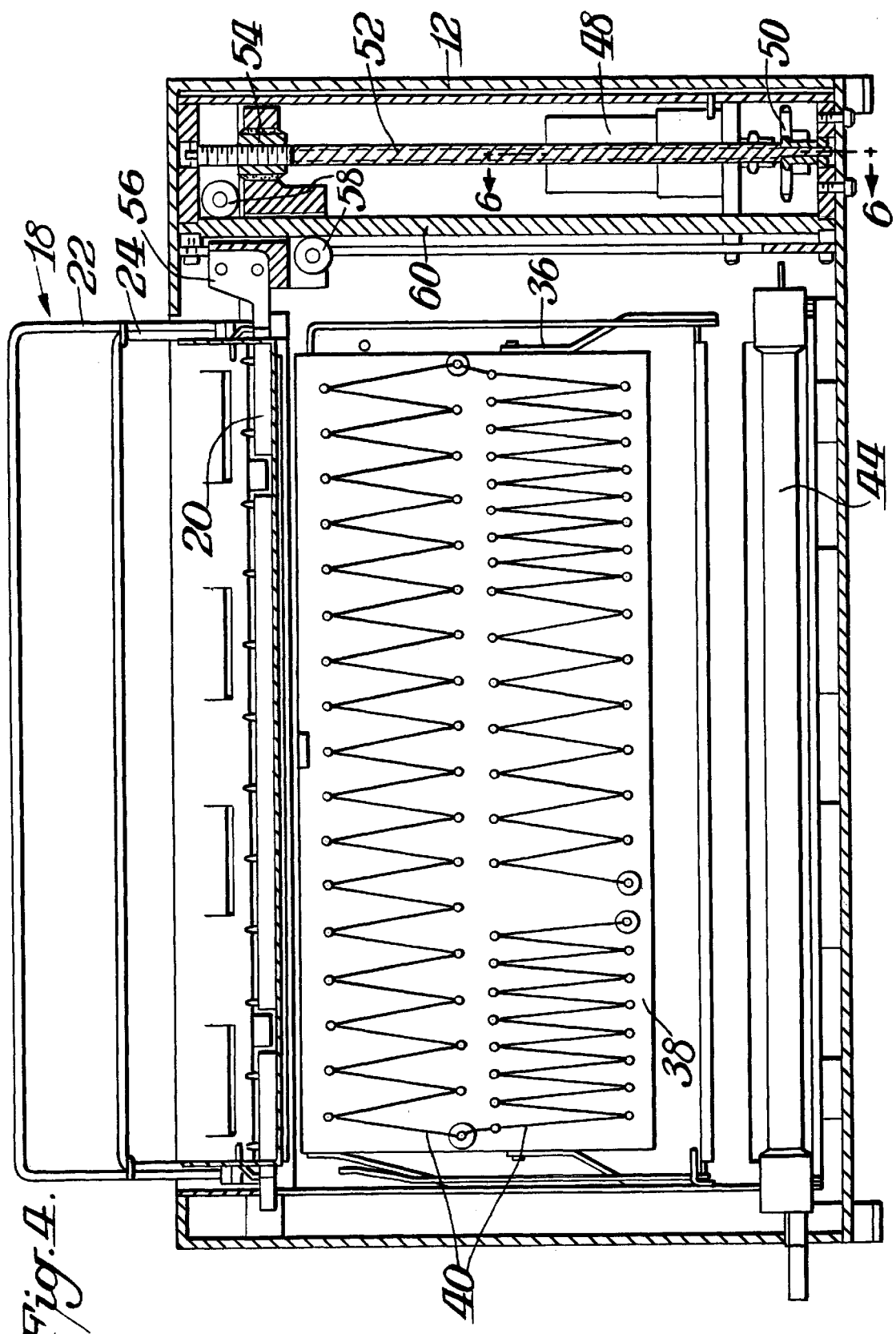

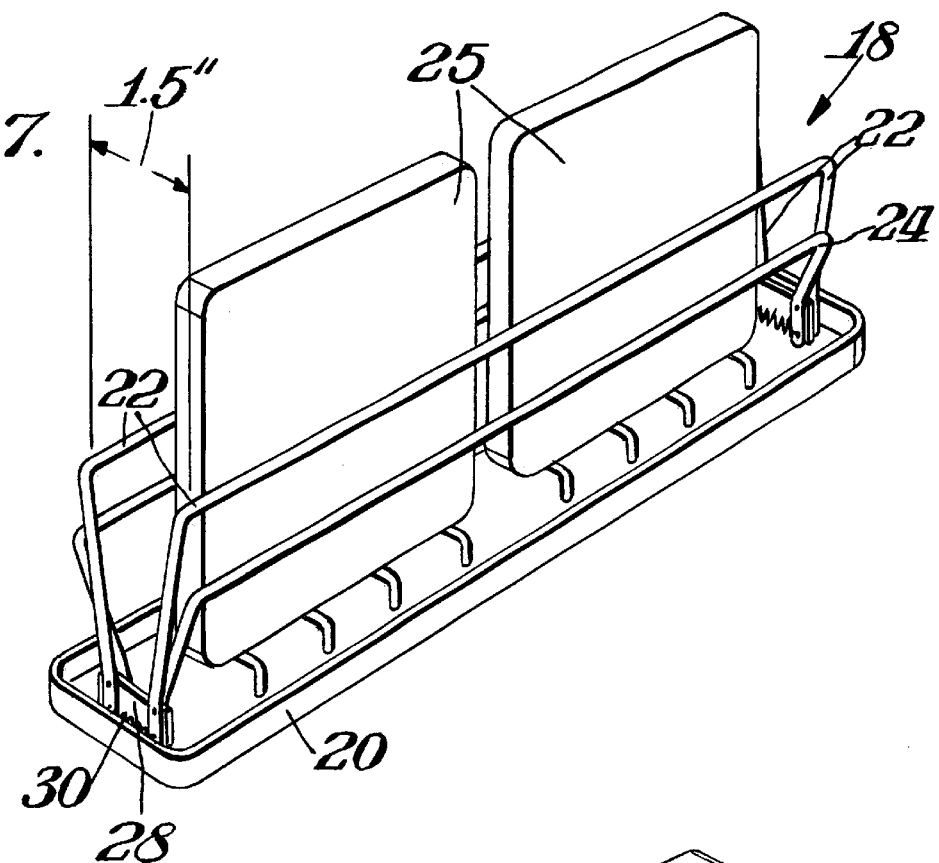
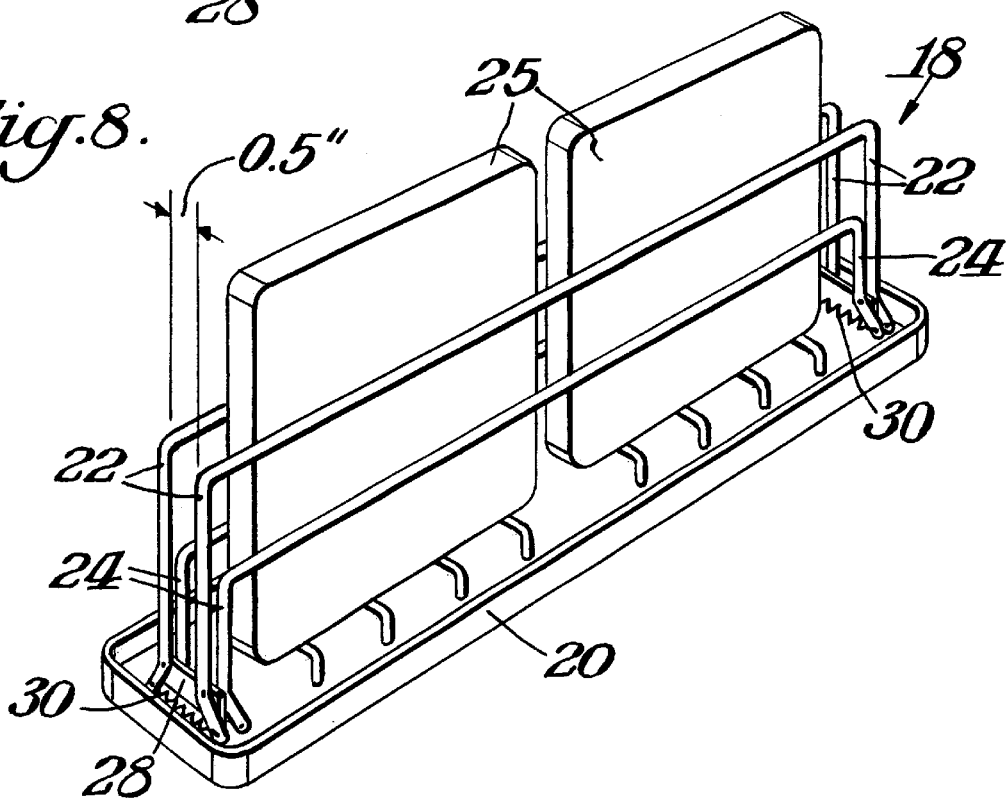

BATCH TOASTER

CROSS-REFERENCE TO RELATED APPLICATION

This application is based upon provisional application Ser. No. 60/133,914, filed May 13, 1999, all of the details of which are incorporated herein by reference thereto.

BACKGROUND OF INVENTION

Batch type toasters and batch type ovens have been used for centuries. In recent years there have been many batch type toaster-ovens. Toasters have a nominally vertical structure wherein the bread or other food to be toasted is first lowered to toasting position either manually or automatically, the toasting elements which are initially at room temperature, then heat up slowly to a toasting temperature and during this slow heat-up the food becomes partially dehydrated before the toasting process begins. The toasting (browning) process of the food or bread further dehydrates the food, the degree of dehydration depending heavily on the time required for the browning. If the browning or toasting takes more than 2–3 minutes, the food—particularly bread can be severely dehydrated and the result, if toasting, is a very dry product like Melba toast. Some people prefer such dry, hard, and moisture "free" toast, but the vast majority of users complain that the resulting toast is tasteless and much too dry. Modern toasters have not discovered the means to toast while retaining much of the original moisture in the bread and such foods. One of the main reasons why freshly baked bread with its crusty exterior is so universally appealing is its high degree of retained water. That appeal is quickly lost after a few hours and day-old bread is vastly less appealing because of the much greater loss of moisture. Retained moisture is critically important to taste, texture and flavor of bread, cakes, cookies and similar foods as well as toast.

SUMMARY OF INVENTION

An object of this invention is to provide within an automatic batch type toaster the optimum thermal conditions for either toasting, baking, warming, defrosting or combinations thereof. The conventional geometry of toasters and the toasting elements create relatively dry and unappetizing toast and such toasting environments are not satisfactory for quality baking, defrosting, or warming. Each of these cooking processes require carefully controlled thermal and radiant environments in order to produce an optimum cooked product.

The unique design of this toaster/baker creates optimum thermal and radiant environments for these very different cooking procedures. The designs of this invention are sufficiently flexible to permit the user a wide choice of texture and retained moisture of the toasted bread, or the baked products. There has not in fact been a toaster with the unique features offered here for optimum toasting or an oven with the many novel features which this invention includes. These are described here separately and in combination for a better understanding of the uniqueness of this new cooking system.

In the subject toaster, the loss of moisture from the bread/toast for example is reduced by 35% or more depending on: (a) the bulk or thickness of the bread or food and; (b) the relative "heat up" time of the elements; (c) the temperature of the toasting element; (d) the ambient air temperature during both "heat up" and "toasting"; (e) the physical juxtaposition of the food and the heating elements; and (f) the circulation or movement of the air over the food surfaces during preheat and toasting.

The invention relates to a batch type household toaster that has a receptacle or holding compartment for the sliced bread that is remote from the toasting compartment and automatically holds the bread in that receptacle until the toasting elements reach an efficient toasting temperature and until that time isolates the bread from the drying effects that otherwise occur during the preheating period. Only when the toasting elements reach an efficient toasting temperature is the bread automatically transferred to the toasting chamber. That transfer must occur rapidly enough to minimize drying of the bread during transport. By this means the entire toasting cycle occurs under optimum toasting conditions. Toasting occurs quicker than in conventional toasters and the resulting toast is moister, less dry, tastier and more appetizing. The toast has a crisper exterior and is more moisture inside. It is in sharp contrast to Melba toast which is dry throughout its thickness. (For those who prefer drier toast automatic controls can be added to this new toaster so that the bread is moved into the toasting chamber before the heat-up begins, thus drying the bread somewhat before toasting occurs.)

THE DRAWINGS

FIG. 1 is a perspective view of a toaster in accordance with this invention showing the toasting basket in place;

FIG. 2 is a cross-sectional view in elevation of the toaster shown in FIG. 1;

FIG. 3 is a view similar to FIG. 2 in a different phase of operation;

FIG. 4 is a cross-sectional view taken through FIG. 2 along the line 4—4;

FIG. 6 is a cross-sectional view taken through FIG. 4 along the line 6—6;

FIG. 7 is a perspective view showing the basket in a fully open position; and

FIG. 8 is a view similar to FIG. 7 showing the basket in a closed position.

DETAILED DESCRIPTION

Figure 5:
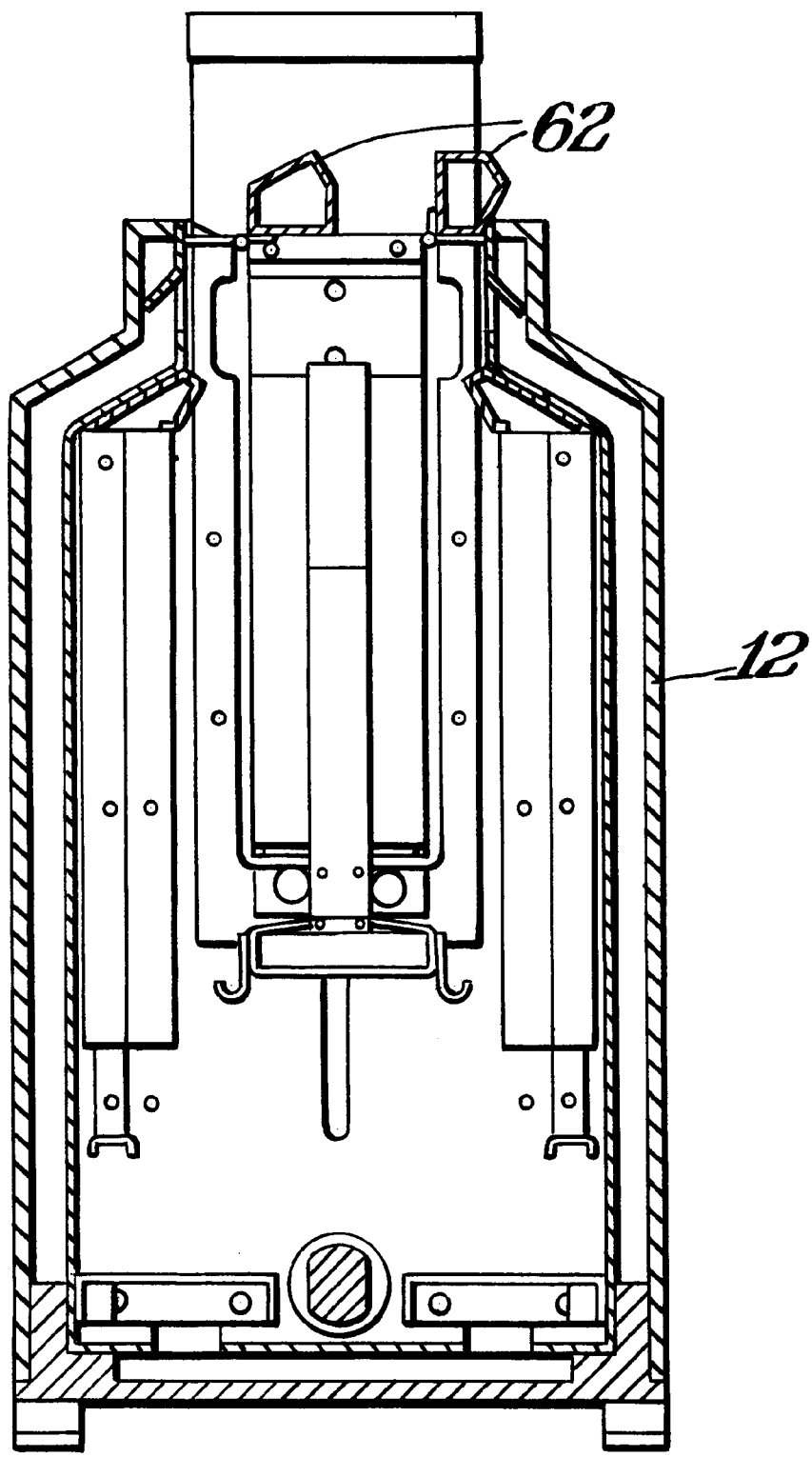
FIG. 5 is a cross-sectional view in elevation of a portion of the device shown in FIGS. 1–4.

The inventor has discovered that sliced bread in a conventional toaster will lose 3% or more of its weight as moisture before the toasting heater elements reach an optimum toasting temperature and before browning begins.

In conventional toasters an unnecessary amount of moisture loss occurs through conductive and convective heat transfer at lower air temperature before the radiant heaters reach the effective radiating temperature range which corresponds to an orange-red heat or hotter. Below a just visible red heat (1100° F.) typical small diameter radiating toaster wires can transfer more heat by conduction and convection than by radiation. Toasting of bread in contrast to only heating of the bread, will occur either at high ambient air temperatures (about 450° F. and above) or with intense radiation that will bring the bread surface to that temperature quickly even in a relatively cool ambient air environment.

To avoid the unnecessary loss of moisture in that period before the heating conditions are optimum for rapid toasting, the bread must be held outside of the toasting zone. In order to reduce the loss of moisture during toasting, the temperature of the heating elements must be as high as practical so that the toasting time is short. In this manner the surface is toasted fast, the moisture loss is reduced and the toast will have a crisp exterior and a moister interior.

A novel batch type toaster has been developed that on command automatically holds the bread in a cooling basket remotely from the toasting zone until the toasting zone is brought up in temperature to optimum toasting conditions, and only then is the bread transported into the toasting zone, where it is toasted quickly, and following sufficient browning of the toast it is quickly ejected and the temperature in the toasting zone is decreased until the next cycle. This cycle is repeated for each piece of bread or for each batch load of bread in the toasting basket.

To accomplish this unique toasting methodology the bread or food to be toasted is placed in a food basket that rests entirely outside the toasting zone, as show in FIGS. 1–2. Instructions are given by the operator to start the heating in the toasting zone either by pressing a button or by depressing manually an appropriate lever. After an appropriate time interval the unique food basket is allowed to enter the toasting zone where it remains for an appropriate relatively short time interval at the end of which the basket with the toasted bread returns to its original position outside the toasting zone and the heaters are turned off.

By this means the actual toasting cycle is very short—as short as 30 seconds compared to 1–2 minutes for conventional toasters where the bread is left in the toaster zone through the entire heat-up and sometimes through the cool-down period.

In order to minimize the loss of moisture from food during toasting one must optimize heat transfer conditions in the toasting zone. This means that the temperature of the heating element, its radiant area, and its proximity to the toaster material, such as sliced bread, must be carefully selected. It is desirable to maximize the ratio of impinging radiant energy heat transfer, $E_R$, to convective heat transfer, $E_C$ from the ambient hot air in the toasting zone. When the ratio $E_R/E_C$ is low, toasting is accomplished primarily by the slower process of convective heat transfer. The rate at which heat is transferred convectively is directly related to the air temperature in the toasting zone. If the air temperature is below about 350° F. for example bread will dry out completely but not brown. Generally people prefer the taste added by the browned surface of bread. Dry bread is unappetizing. Consequently toasting only by using lower temperature hot air will dry bread excessively. In contrast, the rate of heat transfer (power) delivered to the surface of bread can be very high if intense high temperature radiation is directed onto the bread surface and consequently toasting can occur rapidly offering less opportunity for moisture loss. In fact the heat transfer rate can be so high that the surface of the food (bread) will burn—reflecting the fact that the surface temperature is hot enough to carbonize the food rather than partially oxidize the food which gives the browned appearance and favorable taste to toast. Carbonized or burnt toast is not appetizing.

Consequently optimum toasting conditions that will minimize loss of moisture, require the impingement of a high radiant flux, sufficient flux to brown quickly but not so great as to burn the surface of the food or bread. If the flux is sufficient, the air temperature is of lesser importance to the toasting rate. It is true however, that as the temperature of the ambient air in the toasting zone increases the radiant flux required to suitably brown quickly is reduced slightly. Likewise as the ambient air temperature increases, the time necessary to suitably brown decreases. Conventional toasters that use relatively less radiant flux density on the food or toast, have longer toasting cycles, and a greater fraction of the heat transfer is by convective transfer. There is however a greater loss of moisture when the radiation flux falling on the food surface is reduced and the toasting time must consequently be increased.

The radiant flux falling on the food or toast is determined by the temperature of the emission source, usually wires, the area of the emitting source, distance of the source from the food, and geometry of the emitting source. The distance factor is less important if the emitting source extends over a large and extended surface area adjacent the food. The energy density on the food if from a point source varies inversely with the square of the distance between the source and the surface of the food. The total radiant flux emitted from a heated source increases with fourth power of the absolute temperature of the source.

The advantage of this new toasting means is evidenced by the following comparative measurements of moisture loss in a variety of modern commercial toasters. Identical slices of bread were used and each was browned to the same color.

| MODEL | MOISTURE LOSS DURING TOASTING CYCLE (% by weight) |
|---|---|
| Sunbeam Toast Logic | 15.2 |
| Black & Decker | 13.5 |
| Black & Decker (Horizontal) | 13.3 |
| T-Fal Electronic | 16.0 |
| Krups Electronic | 15.3 |
| Cuisinart Countdown | 12.3 |
| Cuisinart Electronic | 12.7 |
| Cuisinart | 14.3 |
| Maxim | 16.0 |
|  | Average of above 14.3% |
| New toaster of this invention (as described above) | 10.2% |

From the above it is clear that on the average conventional toasters lose 40% more water than the new novel means described herein. As the result, the toast made by this novel approach has a softer interior and is more flavorful.

In one aspect of the invention the batch type unit is shaped like a large toaster. As shown in FIGS. 4 and 6 the unit incorporates as its transport mechanism a motor drive and a gear train with the motor drive system having a motor driven threaded rod or screw and a load bearing shaft to raise and lower a toasting basket into which the user can insert bread for toasting. Bread is held in that basket outside the toasting zone until the thermal and radiant conditions in the toasting zone reach optimum toasting conditions. The bread is then lowered into the toasting zone where it is rapidly toasted. The toasting cycle is accelerated by mechanically moving the heated toasting elements inward and against the bread. Power to heaters is then shut off and the toasting basket is raised up and outside of toasting zone. The resulting toast retains more moisture and is more flavorful.

Alternatively, to toast the operator can elect an option that lowers the bread (in its toasting basket) into the toasting zone while the zone is heating up. This removes more moisture from the toast and it is noticeably drier—like one finds in conventional toasters. Some people may prefer this more or less conventional toast.

Higher than conventional temperature heater wires are used which are moved closer to the bread in order to toast faster, thus decreasing moisture loss by 30–40% or so.

For serious baking, the operator inserts a wire mesh baking basket into the vertically-shaped toasting basket. He selects a baking time and temperature and the motor lowers the basket into the "toasting zone". However, during the initial portion of the bake cycle the normal toasting elements are on full for only about 1 to 1½ minutes. An auxiliary quartz tube heater located at the bottom of the unit provides additional heating during the baking cycle. After the first 1 to 1½ minutes (in bake mode) the lower half of the toaster boards and the quartz tube heater provide all of the heat for baking. They are on full power until the baking zone reaches the "set" temperature. At that time a solid state throttling relay throttles back the power to maintain uniform and constant temperature for the balance of the selected baking time.

The baking basket is oriented vertically with a wire mesh on sides and bottom. Hot air can convect around and past the foot in the basket on virtually all sides of the foot (such as french fries). This gives more uniform baking than if the food lies flat on a baking sheet in a conventional oven or toaster oven. This vertical baking basket configuration is unique and believed to be patentable as a stand-along product for any oven.

The operator can elect to bake items such as the popular frozen pocket pouches of food (pizza, ham and cheese, etc.) by using the bake cycle with only the toasting basket in place. We may allow that configuration to be used only a maximum of 10 minutes or so, because with the toasting basket the top of the toaster-oven is not closed and there may be a perceived thermal threat to overheat cabinets from exiting hot-air.

When the baking basket is inserted in the toasting basket and lowered into the heated zone, hinged lids on the baking basket "close" leaving only a narrow slot for hot air to exit out the top. The residual small flow of rising hot air will be non-threatening to cabinets above the unit.

The invention may be practiced where the unit is a container for baking food with at least two sides and bottom constructed of open wire mesh. Rigid supports hold the container at a distance not less than ⅜ inches above the horizontal surface of a baking compartment. The container is designed to hold a layer of food not exceeding 3 inches thick as measured in one of either the horizontal or vertical plane to encourage the flow of heated air through the container around all sides and the bottom of food placed within the open container.

The previously described operation of the invention is apparent from the drawings. For example, as shown in FIGS. 1–3 the toaster 10 is in the form of a housing 12 which has a top wall 14. The top wall 14 includes an opening 16 communicating with the hollow interior of housing 12.

A mobile normally open transport 18 in the form of a basket is located in the opening 16 of top wall 14. Basket 18 includes a toasting tray 20 and skeletal side walls or rails in the form of a first set of bent rods or wires 22,22 and a second set of bent rods or wires 24,24. Details of the basket are also shown in FIGS. 7–8. The basket 18 is located entirely outside of the heated toasting zone 26 as shown in FIG. 2. When the mobile transport or basket 18 is in its first position shown in FIG. 2 the basket is located in an unheated waiting zone. When in its second position, shown in FIG. 3, the basket 18 is in the heated toasting zone.

FIG. 7 shows the basket 18 in its open condition when in the unheated waiting zone, as also shown in FIG. 2. FIG. 8 shows the basket 18 in its closed condition when in the toasting zone as also shown in FIG. 3. As shown in FIGS. 7–8 the skeletal walls include a first set of bent wires or rods 22,22 pivoted at their lower ends to mounting structure 28. The skeletal walls also include a second set of bent wires or rods 24,24 which are also pivoted at their lower ends to mounting structure 28. In the fully open position shown in FIG. 7 the respective bent wires or rods are angled away from each other with the upper ends separated by a distance of 1.5 inches. As also shown in FIGS. 7–8 at the lower ends of the basket sides, wires or rods 22, 22 and 24,24 are mounted together by springs 30 at opposing ends so that basket 18 is ordinarily in the open condition of FIG. 7. Two slices of bread 25 are shown supported in toasting tray 20 and disposed between wires or rods 22,22 and 24,24.

When in the closed condition shown in FIGS. 3 and 8 the bent wires or rods 22,22 and 24,24 are disposed parallel to each other in contact with the bread slices 25. When in the closed position shown in FIG. 8 the parallel sets of rods 22,22 and 24,24 are spaced apart by a distance of 0.5 inches.

As shown in FIGS. 2–3 a pair of curved contact arms 32,32 is provided at the bottom of the toasting tray 20. Within the housing 12 actuating levers 34,34 are provided in the path of motion of contact arms 32,32. As also shown in FIGS. 2–3 pivot hinges 36,36 are mounted to the actuating levers 34,34. FIGS. 2–3 further show the heater boxes 38. As shown in FIG. 4 heated toasting elements or coils 40 are secured to the side walls of heater box 38. Referring again to FIGS. 2–3, when the basket 18 is lowered from the waiting zone in its first position shown in FIG. 2 into the heating zone 26 in its second position shown in FIG. 3 the contact arms 32,32 urge the actuating levers 34,34 outwardly from the position shown in FIG. 2 to the position shown in FIG. 3. The outward rotation of the actuating levers 34,34 causes pivoted movement of pivot hinges 36,36, which in turn causes heater boxes 38 to move toward the bread slices 25. Compare FIGS. 2 and 3. The front surfaces of the heater boxes 38 moving toward each other engage the skeletal side walls 22,24 of the basket 18 moving from the open position of FIGS. 2 and 7 to the closed position of FIGS. 3 and 8. Additionally, as previously noted and as apparent from FIGS. 2 and 3, the heater box side walls move closer together or inwardly so as to be disposed in close contact with the bread, as shown by comparing FIGS. 2 and 3 and as previously described. FIGS. 2 and 3 also illustrate return springs 42,42 mounted to the side walls of heater box 38 and inner frame 12a. Additionally, FIGS. 2–4 illustrate a lower heater 44 mounted at the bottom of the heating zone below and between the side walls of the heater box. With reference to FIGS. 2 and 3 a crumb box 46 is mounted on each side of quartz tube lower heater 44.

FIGS. 4 and 6 illustrate the transport mechanism for raising and lowering basket 18. As shown in FIGS. 4 and 6, an electric motor 48 is located in housing 12. Motor 48 drives a gear train which includes reducer gear 50 and the various other gears shown in FIGS. 4 and 6 to drive threaded rod 52. A nut 54 is engaged on rod 52 and through the illustrated gears drives support carriage 56 connected to tray 20 of basket 18. FIG. 4 also illustrates the threaded rod 52 to be mounted at its upper end in a bearing. As also shown in FIG. 4 a load bearing shaft 60 provides a tracking surface for the offset opposed load bearing rollers 58 allowing movement of the cantilevered basket 18 vertically in and out of the heating zone 26. Thus, the motor drive system by its ultimate connection to support carriage 56 rotates a screw 52 which moves the support carriage 56 and associated basket 18 up or down to thereby lift or lower the tray carrier 20 and the remainder of basket 18.

The toaster 10 also includes associated electrical and electronic controls designed to activate the radiant heater or heaters while restraining motion of the transport holder or basket in the waiting zone remote from the toasting zone until the temperature of the radiant heaters and the thermal conditions in the toasting zone have reached designated toasting conditions and then direct the mobile transport or basket to enter and be held within the toasting zone until the toasting cycle is complete.

As shown in FIG. 5 as the basket lowers into the toaster, hinged lids 62 are forced closed by the ramp on the lid handles forming a closure at the top of the heating chamber creating an oven. This feature is previously described with respect to use of the toaster for baking purposes.

What is claimed is:

1. A batch type toaster for sliced bread consisting of a heated toasting zone, one or more radiant heaters in said toasting zone, a mobile normally open transport to hold the bread slice, a designated unheated waiting zone for said mobile transport remote from toasting zone, a transport mechanism to transfer said open transport with the bread slice from said waiting zone to the toasting zone, associated electrical and electronic controls designed to activate said radiant heater or heaters while restraining motion of said transport holder in said waiting zone remote from said toasting zone until the temperature of the radiant heaters and the thermal conditions in said toasting zone have reached designated toasting conditions and then direct said mobile transport to enter and be held within said toasting zone until the toasting cycle is complete.

2. A toaster according to claim 1 wherein said toasting zone is located in the interior of a hollow housing, said housing having a top wall, an opening in said top wall communicating with said interior, said mobile transport comprising a basket having a first position located at said top wall and extending outwardly of said housing entirely outside of said toasting zone, said first position being said waiting zone, and said basket being movable by said transport mechanism to a second position in said toasting zone.

3. A toaster according to claim 2 wherein said basket includes a bottom toasting tray for receiving the bread slice, and said basket further including skeletal side walls for being disposed on opposite sides of the bread slice.

4. A toaster according to claim 3 wherein said skeletal side walls are pivotally mounted for being angled away from each other when said basket is in said waiting zone whereby said basket is in an open condition to readily receive the bread slice, and said skeletal side walls are pivoted toward each other when said basket is in said heated zone.

5. A toaster according to claim 4 wherein a heater box is located in said heated zone, said heater box having side walls with heater elements mounted on said side wall.

6. A toaster according to claim 5 wherein a lower heater is mounted in said heated zone below and between said heater box side walls.

7. A toaster according to claim 6 including actuating structure in said housing for moving said heater box heater elements toward each other for being disposed close to the bread slice.

8. A heater according to claim 5 including actuating structure in said housing for moving said heater box heater elements toward each other for being disposed close to the bread slice.

9. A heater according to claim 1 wherein a heater box is located in said heated zone, said heater box having side walls with heater elements mounted on said side wall.

10. A heater according to claim 9 wherein a lower heater is mounted in said heated zone below and between said heater box side walls.

11. A heater according to claim 10 including actuating structure in said housing for moving said heater box heater elements toward each other for being disposed close to the bread slice.

12. A heater according to claim 9 including actuating structure in said housing for moving said heater box heater elements toward each other for being disposed close to the bread slice.

13. A toaster according to claim 1 where said one or more radiant heaters in said toasting zone are held at an orange-red color temperature.

14. A toaster according to claim 13 where said one or more radiant heaters include heating elements which are mechanically movable inward and against the bread to accelerate the toasting cycle.

15. A toaster according to claim 1 wherein said mobile transport includes a supporting base that isolates the bread from thermal drying effects during a preheat period until said thermal conditions in said toasting zone reach designated toasting conditions and said mobile transport is then directed to enter said toasting zone.

16. A toaster according to claim 1 where said mobile transport holding the bread has pivoting rails that restrain the bread to maintain a vertical orientation within said mobile transport.

17. A toaster according to claim 1 wherein said transport mechanism includes a motor driven screw and a load bearing shaft to move and support said mobile transport.

18. A toaster according to claim 1 wherein said radiant heater or heaters extend over a large and extended surface area adjacent a food being toasted.

19. A toaster according to claim 1 where said electrical and electronic controls include controls to permit movement of the bread into the toasting zone before said one or more radiant heaters are activated.

20. A toaster according to claim 1 where an auxiliary tubular heater is positioned below said one or more radiant heaters.

* * * * *